United States Patent
Sun et al.

(10) Patent No.: US 6,341,034 B1
(45) Date of Patent: Jan. 22, 2002

(54) OPTICAL AMPLIFIER SYSTEM WITH TRANSIENT CONTROL USING SPECTRALLY FILTERED INPUT

(75) Inventors: Yan Sun, Menlo Park; Jun Ye, Palo Alto, both of CA (US)

(73) Assignee: Onetta Inc., Sunnyvale, CA (US)

( * ) Notice: Subject to any disclaimer, the term of this patent is extended or adjusted under 35 U.S.C. 154(b) by 0 days.

(21) Appl. No.: 09/711,924

(22) Filed: Nov. 15, 2000

Related U.S. Application Data
(60) Provisional application No. 60/240,979, filed on Oct. 18, 2000.

(51) Int. Cl.[7] ................................................. H04B 10/12
(52) U.S. Cl. ............................. 359/341.41; 359/337.1; 359/337.2
(58) Field of Search ....................... 359/341.41, 341.42, 359/337.1, 337.11, 337.2

(56) References Cited

U.S. PATENT DOCUMENTS

| | | | |
|---|---|---|---|
| 5,225,922 A | * 7/1993 | Chraplyvy | 359/124 |
| 5,245,690 A | 9/1993 | Aida et al. | 385/142 |
| 5,497,264 A | * 3/1996 | Bayart | 359/337 |
| 5,506,724 A | * 4/1996 | Shizimizu | 359/341 |
| 5,513,029 A | 4/1996 | Roberts | 359/177 |
| 5,745,283 A | 4/1998 | Inagaki et al. | 359/341 |
| 5,812,710 A | 9/1998 | Sugaya | 385/27 |
| 5,864,423 A | * 1/1999 | Kosaka | 359/341 |
| 5,900,969 A | 5/1999 | Srivastava et al. | 359/341 |
| 5,907,429 A | * 5/1999 | Sugata | 359/341 |
| 5,995,275 A | * 11/1999 | Sugaya | 359/341 |
| 6,025,947 A | * 2/2000 | Sugaya | 359/160 |
| 6,049,413 A | 4/2000 | Taylor et al. | 359/337 |
| 6,061,171 A | 5/2000 | Taylor et al. | 359/341 |
| 6,091,541 A | * 7/2000 | Yoon | 359/341 |
| 6,094,296 A | * 7/2000 | Koska | 359/341 |
| 6,094,298 A | 7/2000 | Luo et al. | 359/346 |
| 6,144,485 A | 11/2000 | Sugaya et al. | 359/337 |
| 6,160,659 A | * 12/2000 | Kinoshita | 359/334 |
| 6,163,399 A | 12/2000 | Berg | 359/341 |
| 6,166,850 A | 12/2000 | Roberts et al. | 359/341 |
| 6,198,572 B1 | 3/2001 | Sugaya et al. | 359/337 |
| 6,236,499 B1 | 5/2001 | Berg et al. | 359/341 |
| 6,288,836 B1 | * 9/2001 | Kawasaki | 359/341.42 |

FOREIGN PATENT DOCUMENTS

| | | |
|---|---|---|
| EP | 0 734 105 A2 | 9/1996 |
| WO | 97/28584 | 8/1997 |
| WO | 00/41346 A1 | 7/2000 |

OTHER PUBLICATIONS

Yadlowsky, M.J. et al. "Optical Fibers and Amplifiers for WDM Systems." Proc. IEEE. vol. 85, No. 11, Nov. 1997., pp. 1765–1779.*

(List continued on next page.)

Primary Examiner—Thomas H. Tarcza
Assistant Examiner—Andrew R Sommer
(74) Attorney, Agent, or Firm—G. Victor Treyz; Morgan, Lewis & Bockius LLP

(57) ABSTRACT

Optical amplifiers are provided for use in fiber-optic communications networks. An optical amplifier may be controlled to prevent gain transients. The optical amplifier may use a spectrally-filtered input power tap to monitor input power. Amplifier gain may be controlled based on the monitored spectrally-filtered input power. Gain may be provided using one or more rare-earth-doped fiber coils such as erbium-doped fiber coils. The coils may be pumped by laser diodes or other suitable pumps. The optical output power of the pumps may be controlled by a control unit. The control unit may calculate the appropriate pump power for the pumps to supply to the fiber coils based on the measured spectrally-filtered input power of the amplifier. The output power of the amplifier may also be measured. A combination of feed-forward and feedback techniques may be used to calculate the pump power to be supplied by the pumps.

38 Claims, 14 Drawing Sheets

OTHER PUBLICATIONS

Sun et al. "Optical Fiber Amplifiers for WDM Optical Networks" Bell Labs Journal, p. 187–206, Jan.—Mar., 1999.

Nortel Networks Datasheet "MGM Multiwavelength Gain Module" (Nov. 3, 2000).

Ono et al. "Automatic Gain Control in Silica–Based EDFA with over 50nm Flat Gain Bandwidth using an all Optical Feedback Loop" $10^{th}$ Optical Amplifiers and their Applications Technical Digest, Jun. 9–11, 1999.

Kakui et al. "Dynamic–Gain–Tilt–Free Long–Wavelength Band Erbium Doped Fiber Amplifiers Utilizing Temperature Dependent Characteristics of Gain Spectrum" $25^{th}$ Optical Fiber Communication Conference, Technical Digest, p. 6–8, (Mar. 8, 2000).

Delavaque et al. "Gain Control in Erubium–Doped Fibre Amplifiers by Lasing at 1480nm With Photoinduced Bragg Gratings Written on Fibre Ends" Electronics Letters, vol. 29, No. 12, p. 1112–1114, Jun. 10, 1993.

Massicott et al. "1480nm Pumped Erbium Doped Fibre Amplifier with all Optical Automatic Gain" Electronics Letters, vol. 30, No. 12 p 962–964, Jun. 9, 1994.

Motoshima et al. "EDFA with Dynamic Gain Compensation for Multiwavelength Transmission Systems" OFC '94 Technical Digest, p. 191–192.

Desurvire et al. "Gain Control in Erbium–Doped Fibre Amplifiers by an All Optical Feedback Loop" Electronics Letters, vol. 27, No. 7, p. 560–561, Mar. 28, 1991.

\* cited by examiner

|       | $P_{IN}$ | $P_A$ | GEF | $P_{OUT}$ |
|-------|----------|-------|-----|-----------|
| CH 1  | .01 W    | 1/2 W | 1/3 | 1/6 W     |
| CH 2  | .01 W    | 1/3 W | 1/2 | 1/6 W     |
| CH 3  | .01 W    | 1/6 W | 1   | 1/6 W     |

FIG. 7

|       | $P_{IN}$ | $P_A$ | GEF | $P_{OUT}$ |
|-------|----------|-------|-----|-----------|
| CH 1  | .01 W    | 1/3 W | 1/3 | 1/9 W     |
| CH 2  | 0        | 0     | 1/2 | 0         |
| CH 3  | 0        | 0     | 1   | 0         |

FIG. 8

|       | $P_{IN}$ | $P_A$ | GEF | $P_{OUT}$ |
|-------|----------|-------|-----|-----------|
| CH 1  | 0        | 0     | 1/3 | 0         |
| CH 2  | 0        | 0     | 1/2 | 0         |
| CH 3  | .01      | 1/3 W | 1   | 1/3 W     |

FIG. 9

|  | $P_{IN}$ | SPECTRUM FILTER | $P_B$ | $P_C$ | GEF | $P_{OUT}$ |
|---|---|---|---|---|---|---|
| CH 1 | .01 W | 1 | .01 W | 1/2 W | 1/3 | 1/6 W |
| CH 2 | .01 W | 2/3 | .0067 W | 1/3 W | 1/2 | 1/6 W |
| CH 3 | .01 W | 1/3 | .0033 W | 1/6 W | 1 | 1/6 W |
| TOTAL | .03 W |  | .02 W | 1 W |  | 1/2 W |

FIG. 12

| | $P_{IN}$ | SPECTRUM FILTER | $P_B$ | $P_C$ | GEF | $P_{OUT}$ |
|---|---|---|---|---|---|---|
| CH 1 | .01 W | 1 | .01 W | 1/2 W | 1/3 | 1/6 W |
| CH 2 | 0 | 2/3 | 0 | 0 | 1/2 | 0 |
| CH 3 | 0 | 1/3 | 0 | 0 | 1 | 0 |

FIG. 13

| | $P_{IN}$ | SPECTRUM FILTER | $P_B$ | $P_C$ | GEF | $P_{OUT}$ |
|---|---|---|---|---|---|---|
| CH 1 | 0 | 1 | 0 | 0 | 1/3 | 0 |
| CH 2 | .01 W | 2/3 | .0067 W | 1/3 W | 1/2 | 1/6 W |
| CH 3 | 0 | 1/3 | 0 | 0 | 1 | 0 |

FIG. 14

| | $P_{IN}$ | SPECTRUM FILTER | $P_B$ | $P_C$ | GEF | $P_{OUT}$ |
|---|---|---|---|---|---|---|
| CH 1 | 0 | 1 | 0 | 0 | 1/3 | 0 |
| CH 2 | 0 | 2/3 | 0 | 0 | 1/2 | 0 |
| CH 3 | .01 W | 1/3 | .0033 W | 1/6 W | 1 | 1/6 W |

FIG. 15

OPTICAL AMPLIFIER SYSTEM WITH TRANSIENT CONTROL USING SPECTRALLY FILTERED INPUT

This application claims the benefit of provisional patent application No. 60/240,979, filed Oct. 18, 2000.

BACKGROUND OF THE INVENTION

The present invention relates to fiber-optic communications networks, and more particularly, to optical amplifiers with transient control capabilities for use in optical communications networks.

In optical networks that use wavelength division multiplexing, multiple wavelengths of light are used to support multiple communications channels on a single fiber. Optical amplifiers are used in such networks to amplify optical signals that have been subject to attenuation over multi-kilometer fiber-optic links. A typical amplifier may include erbium-doped fiber amplifier components that are pumped with diode lasers. The erbium-doped fiber amplifier stages increase the strength of the optical signals being transmitted over the fiber-optic links.

The gain of the erbium-doped fiber amplifier stages depends on the inversion level of erbium ions in the fiber. If, for example, the inversion level of a given stage is high, the gain of the stage will be high. If the inversion level of a stage is low, the gain of the stage will be low. Unless control electronics are used to maintain a steady inversion level under various operating conditions, the gain of erbium-doped fiber amplifier stages will be subject to unacceptable transients. Gain transients in an amplifier may cause fluctuations in the power of the output signals from the amplifier. If the output signals are too weak, it may not be possible to detect the signals. If the output signals are too strong, the signals may be subject to nonlinear optical effects in the fiber.

It is an object of the present invention to provide optical amplifier systems in which gain transients are controlled.

SUMMARY OF THE INVENTION

This and other objects of the invention are accomplished in accordance with the present invention by providing optical amplifiers that use a spectrally-filtered input power tap to monitor input power. The gain of the optical amplifiers may be adjusted based on the monitored input power.

An amplifier may have a gain stage based on one or more rare-earth-doped fiber coils such as erbium-doped fiber coils. The coils may be pumped by laser diodes or other suitable sources of pump light. For example, the coils may be pumped using one or more laser diode sources with wavelengths of 980 nm or 1480 nm. The optical output power of the laser diodes may be controlled by controlling the amount of drive current used to power the diodes.

A control unit may be used to calculate the appropriate drive current to apply to the pumps based on the measured spectrally-filtered input power of the amplifier. The output power of the amplifier may be measured using an optical tap and a photodetector. If desired, a combination of feed-forward and feedback techniques may be used to calculate the drive current to apply to the amplifier pumps.

Further features of the invention and its nature and various advantages will be more apparent from the accompanying drawings and the following detailed description of the preferred embodiments.

BRIEF DESCRIPTION OF THE DRAWINGS

FIG. 7 is a table showing input and output conditions for a fiber amplifier of the type shown in FIG. 6 when three channels are being carried.

FIG. 8 is a table showing input and output conditions for a fiber amplifier of the type shown in FIG. 6 when the last two of the three channels of FIG. 7 have been dropped and a pure feed-forward control scheme without spectral filtering of the input power is being used.

FIG. 9 is a table showing input and output conditions for a fiber amplifier of the type shown in FIG. 6 when the first two of the three channels of FIG. 7 have been dropped and a pure feed-forward control scheme without spectral filtering of the input power is being used.

FIG. 12 is a table showing input and output conditions for a fiber amplifier of the type shown in FIG. 10 when three illustrative channels are being carried in accordance with the present invention.

FIG. 13 is a table showing input and output conditions for a fiber amplifier of the type shown in FIG. 10 when the last two of three illustrative channels have been dropped in accordance with the present invention.

FIG. 14 is a table showing input and output conditions for a fiber amplifier of the type shown in FIG. 10 when the first and last of three illustrative channels have been dropped in accordance with the present invention.

FIG. 15 is a table showing input and output conditions for a fiber amplifier of the type shown in FIG. 10 when the first two of three illustrative channels have been dropped in accordance with the present invention.

DETAILED DESCRIPTION OF THE PREFERRED EMBODIMENTS

Figure 1:
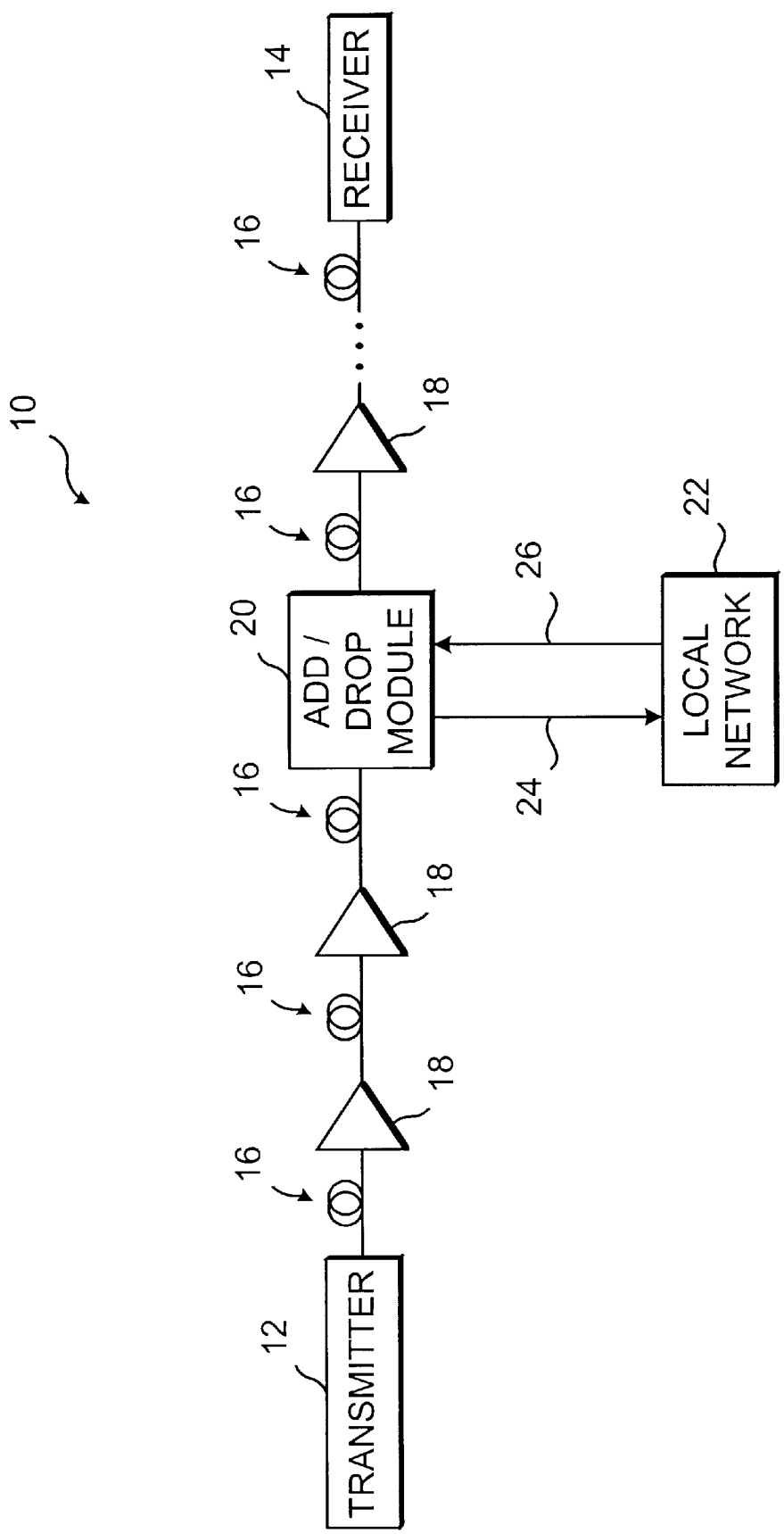
FIG. 1 is a schematic diagram of an illustrative optical communications link using optical amplifiers with transient control capabilities in accordance with the present invention.

An illustrative optical communications link 10 in accordance with the present invention is shown in FIG. 1. A transmitter 12 may transmit information to a receiver 14 over a series of fiber links. Each fiber link may include a span 16 of optical fiber. Fiber spans may be on the order of 40–120 km in length for long-haul networks or may be any other suitable length for use in signal transmission in an optical communications network.

As optical signals travel along the optical fibers 16, signal strength is attenuated. Optical amplifiers 18 may therefore be used to amplify the optical signals between successive spans of fiber.

The communications link of FIG. 1 may be used to support wavelength-division-multiplexing arrangements in which multiple communications channels are provided using multiple wavelengths of light. For example, the link of FIG. 1 may support a system with 40 channels, each using a different optical carrier wavelength. Optical channels may be modulated at, for example, approximately 10 Gbps (OC-192). The carrier wavelengths that are used may be in the vicinity of 1530–1560 nm. These are merely illustrative system characteristics. If desired, more channels may be provided (e.g., hundreds of channels), signals may be modulated at faster data rates (e.g., at approximately 40 Gbps for OC-768), and a wider range of carrier wavelengths may be supported (e.g., 1480–1610 nm).

Transmitter 12 may include laser diodes each of which supports a channel operating at a different wavelength. If one or more of these lasers is taken out of service or if new channels are added at transmitter 12, the number of wavelengths being transmitted across link 10 may change abruptly. The number of channels being carried by link 10 may also change due to unexpected system failures such as fiber cuts.

Link 10 may include add/drop modules such as add/drop module 20. Module 20 may be used to separate channels at certain wavelengths from the main fiber path in link 10. The separated channels may be provided to a local network such as local network 22 over a fiber link 24. Communications traffic from the local network may be provided to module 20 over a fiber link 26. If link 26 is cut accidentally or if the network is reconfigured so that a different number of channels are provided over the fiber span fed by module 20, the number of channels carried by link 10 following add/drop module 20 may change abruptly.

Figure 2:
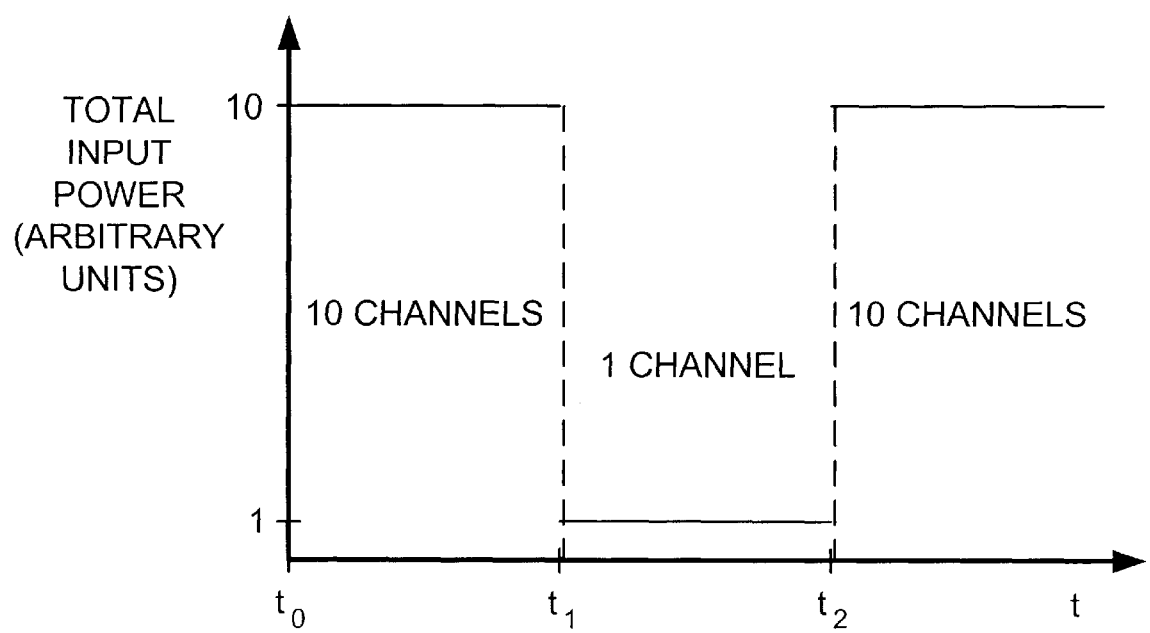
FIG. 2 is a graph showing how the input power applied to an optical amplifier may change suddenly when the number of channels handled by the amplifier changes.

A graph showing how the total signal power carried by a fiber in a link such as link 10 of FIG. 1 may vary under transient conditions is shown in FIG. 2. In the example of FIG. 2, the fiber link is initially carrying ten signal channels. The total input power at a given amplifier 18 of link 10 is therefore relatively constant between time $t_0$ and $t_1$. At time $t_1$, nine of the original channels are dropped (e.g., due to a system failure or an intentional system reconfiguration). As a result, the total power applied to the input of the given amplifier 18 drops to one tenth of its original level. At time $t_2$, the nine dropped channels are restored, so that the system is again handling ten channels. The total input power to the amplifier therefore increases abruptly. As illustrated by this example, optical amplifiers must handle transients due to both added channels and dropped channels.

Figure 3:
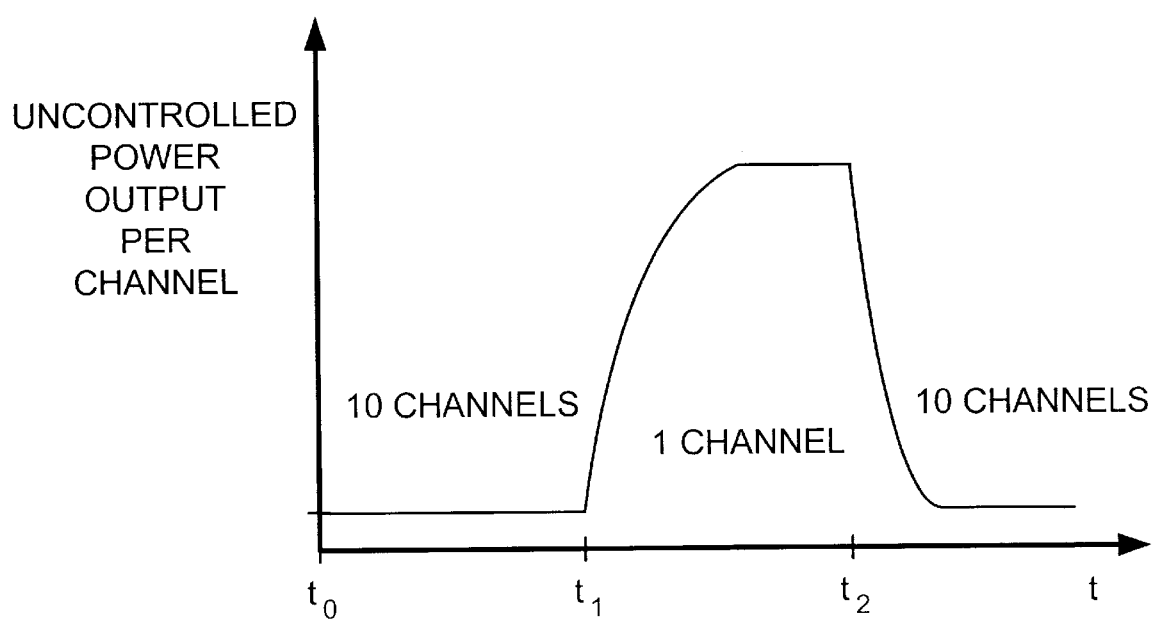
FIG. 3 is a graph showing the output power behavior of a fiber amplifier without transient control capabilities when the input power changes as shown in FIG. 2.

An erbium-doped fiber amplifier with a constant pump level will not produce a well-controlled output signal in response to such large variations in the input signal level. The output power per channel from an amplifier without transient control when the amplifier receives an input signal of the type shown in FIG. 2 is shown in FIG. 3. At $t_1$, when 9 channels are dropped, the output power for the surviving channel begins to rise (with a time constant on the order of milliseconds), because the pump power (which has not changed) is too large. The overly-large pump power builds up an excessive level of inversion in the fiber coil, which significantly increases the gain experienced by the surviving channel. As a rough approximation, the gain for the surviving channel increases to 10 times its previous value. This causes the amplifier output power for the surviving channel to increase to approximately 10 times its original level. An amplifier with gain fluctuations of this type is generally unacceptable, because the output power in each channel varies too much under different input conditions.

One possible approach for controlling the gain fluctuations in a fiber amplifier involves using a pure feedback approach. With this approach, the gain of the amplifier is monitored in real time by measuring the input and output powers. The pump power that is supplied to the fiber coils is adjusted as needed to maintain the gain at a fixed value. As illustrated by the example of FIG. 3, however, the output power of a channel does not rise or fall immediately after other channels have been added or dropped. This is because the average inversion level in the amplifier does not change instantly. As a result, there is a delay between the time at which an input channel is added or dropped and the time at which this change affects the measured gain ($P_{out}/P_{in}$). Accordingly, amplifier control systems based on pure feedback techniques may not be able to respond to changes in amplifier input conditions as rapidly as desired.

Another control technique that might be used to control the gain level in fiber amplifiers involves a pure feed-forward approach. With this approach, the pump power that is supplied to the pump sources in the amplifier is determined based on the measured unfiltered input power to the amplifier. This technique allows the amplifier to anticipate the effect that a change in input power will have on the amplifier even before that effect is measured at the amplifier output.

Figure 4:
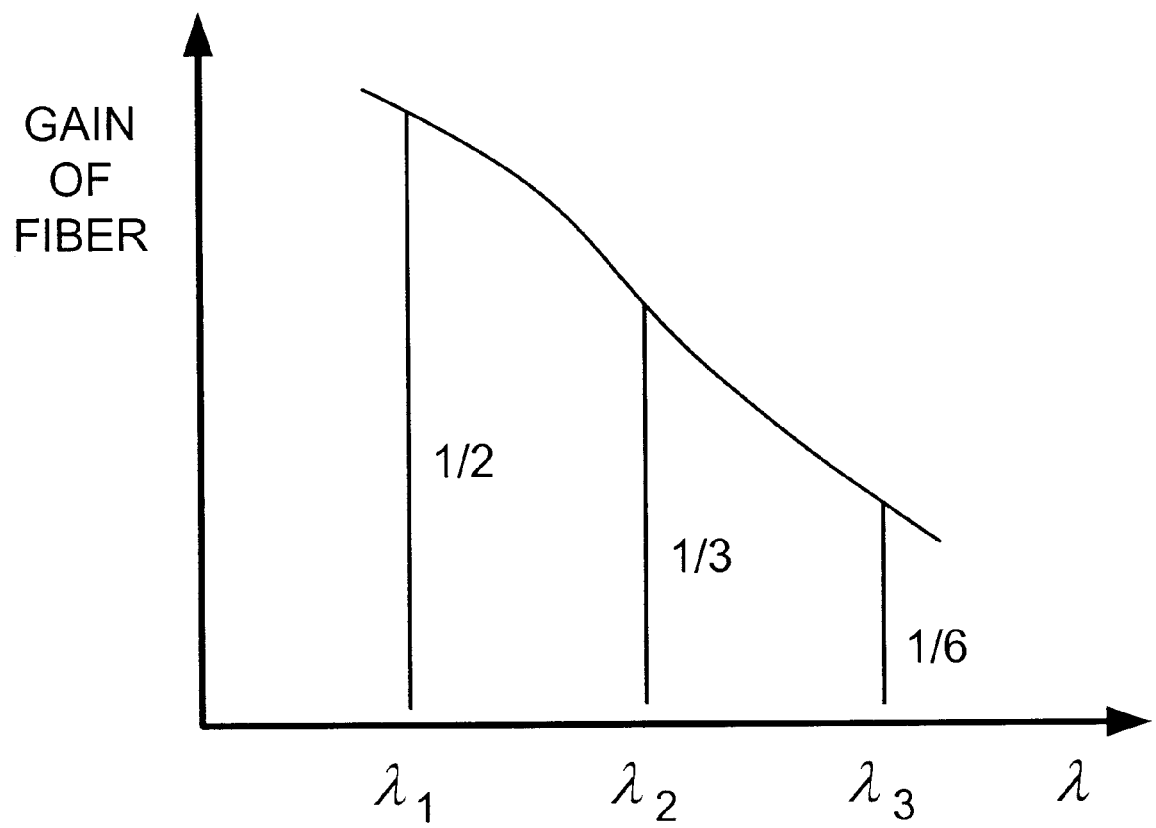
FIG. 4 is a graph showing a portion of a gain spectrum for an illustrative fiber amplifier coil in accordance with the present invention.
Figure 5:
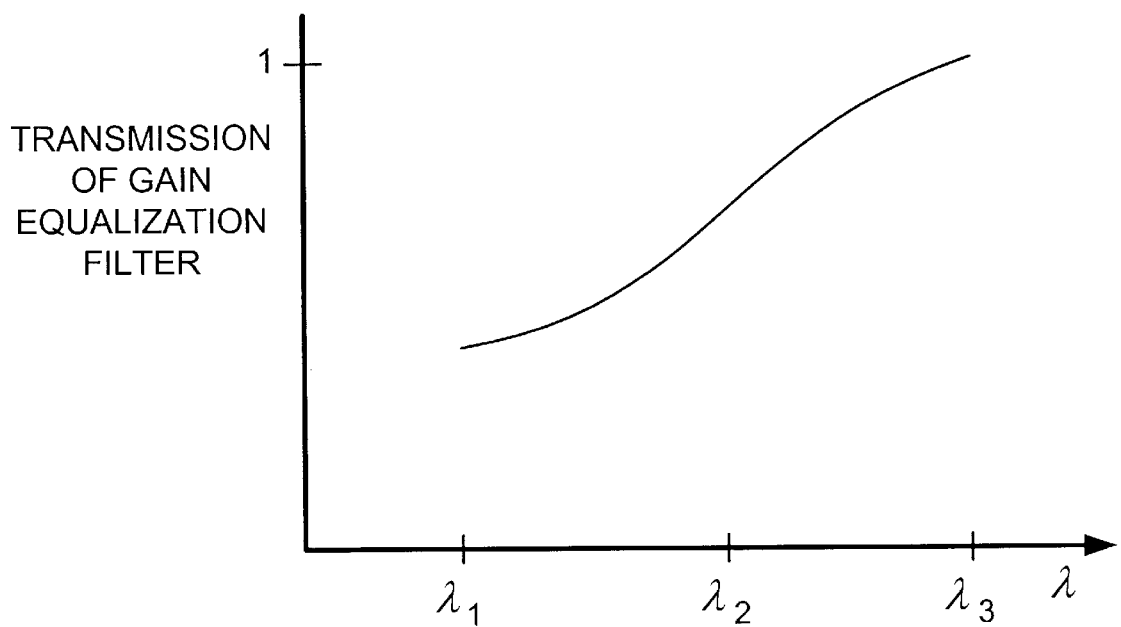
FIG. 5 is a graph showing a portion of the transmission spectrum of an illustrative gain equalization filter in accordance with the present invention.

However, pure feed-forward approaches based on unfiltered input power measurements are not able to control amplifier gain accurately in systems in which the gain of the amplifier's fiber coils is not spectrally flat. This is illustrated in FIGS. 4–9. An illustrative portion of a typical doped-fiber gain spectra is shown in FIG. 4. In the example of FIG. 4, the gain experienced by a signal at wavelength $\lambda_1$ is ½ (in arbitrary units), the gain experienced by a signal at wavelength $\lambda_2$ is ⅓ (in arbitrary units), and the gain experienced by a signal at wavelength $\lambda_3$ is ⅙ (in arbitrary units). In order to flatten the gain of an amplifier that uses the fiber of FIG. 4, a complementary gain equalization filter is placed in series with the amplifying fiber coil. An illustrative transmission spectrum for a gain equalization filter to be used to compensate for the gain spectrum of FIG. 4 is shown in FIG. 5. As shown in FIG. 5, the gain equalization filter transmits light at $\lambda_3$ without attenuation, but attenuates light at $\lambda_1$ and $\lambda_2$ to compensate for the larger gain experienced by these wavelengths in the fiber coil of the amplifier.

Figure 6:
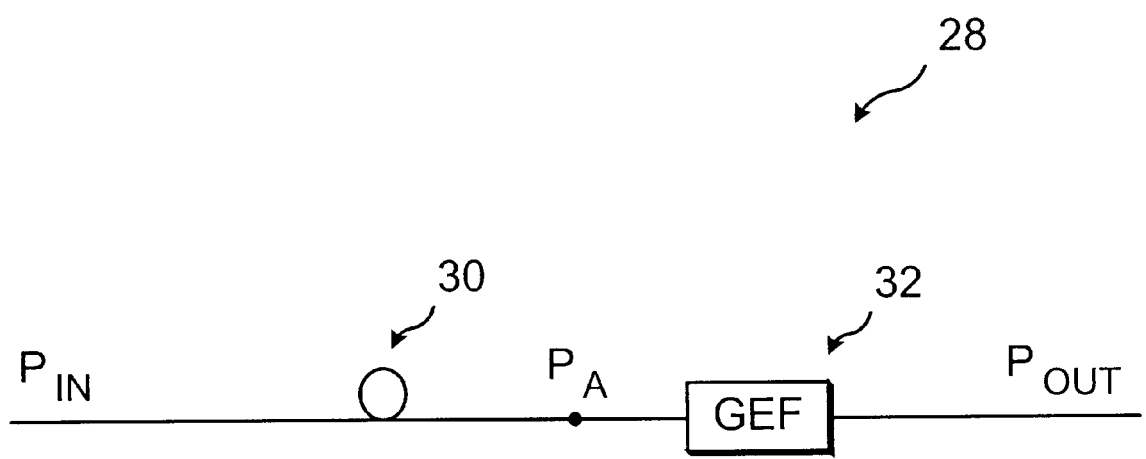
FIG. 6 is a simplified schematic diagram of a fiber amplifier having a fiber coil with a gain spectrum of the type shown in FIG. 4 and having a gain equalization filter with a transmission spectrum of the type shown in FIG. 5.

A simplified diagram of a fiber amplifier 28 having a fiber coil 30 with the gain spectrum of FIG. 4 and a gain equalization filter 32 with the transmission spectrum of FIG. 5 is shown in FIG. 6. With a pure feed-forward approach, input power ($P_{IN}$) is measured without spectral filtering and is used to control the pump power supplied to coil 30. The power in the fiber between coil 30 and gain equalization filter 32 has a power $P_A$. After the gain equalization filter, the output power of the amplifier is $P_{OUT}$.

A channel dropping scenario that illustrates the problem associated with using the pure feed-forward control approach in fiber amplifiers of the type shown in FIG. 6 is described below in connection with the tables of FIGS. 7–9. Initially, as shown in the table of FIG. 7, the three wavelengths shown in FIGS. 4 and 5 are carried by the system. Channel 1 uses wavelength $\lambda_1$, channel 2 uses wavelength $\lambda_2$, and channel 3 uses wavelength $\lambda_3$. The input power for all three channels is the same, but due to the gain spectrum of FIG. 4, the power $P_A$ is greatest for channel 1 and is lowest for channel 3. The transmission of the gain equalization filter is selected to equalize for the differences in the power PA. Accordingly, in the configuration of FIG. 7 in which all three channels are being carried, the output power for each channel is the same (⅙ W).

If channels 2 and 3 are dropped, as shown in the table of FIG. 8, the input power to the system is ⅓ of its original value (i.e., 0.01 W rather than 0.03 W). Using the pure feed-forward methodology, the pump power is therefore reduced to ⅓ of its original level. If amplifier 28 is in saturation, all of the gain in the amplifier is experienced by the signal on channel 1, so that the output power of coil 30 ($P_A$) is ⅓ W. After the gain equalization filter 32, the output power for channel 1 is ⅑ W.

If, instead, channels 1 and 2 are dropped, as shown in the table of FIG. 9, the channel 3 signal experiences all of the gain of the amplifier. The pump power is reduced to ⅓ of its initial value based on the measured input power drop using the pure feed-forward approach. Accordingly, the channel 3 signal after coil 30 (PA) is 1/3 W. Because the transmission factor for the gain equalization filter 32 is 1 (100%) at the channel 3 wavelength (as opposed to ⅓ at the channel 1 wavelength), the output power for channel 3 is ⅓ W.

Thus in the dropped-channel scenario of FIG. 8, an input power of 0.01 W is amplified to an output power of ⅑ W, whereas in the dropped-channel scenario of FIG. 9, an input power of 0.01 W is amplified to an output power of ⅓ W. This represents a significant variability in the gain performance of the amplifier and is generally unacceptable.

In accordance with the present invention, an input power tap arrangement is used that has a spectral filter. The spectral filter matches the gain spectrum of the amplifier's gain medium. This allows a pure feed-forward control technique to be used to control input power transients. It is not necessary to use feedback to control the input power transients, because the spectral filter eliminates the problems associated with using pure feed-forward approaches in systems with gain equalization filters and wavelength-dependent gains.

Figure 10:
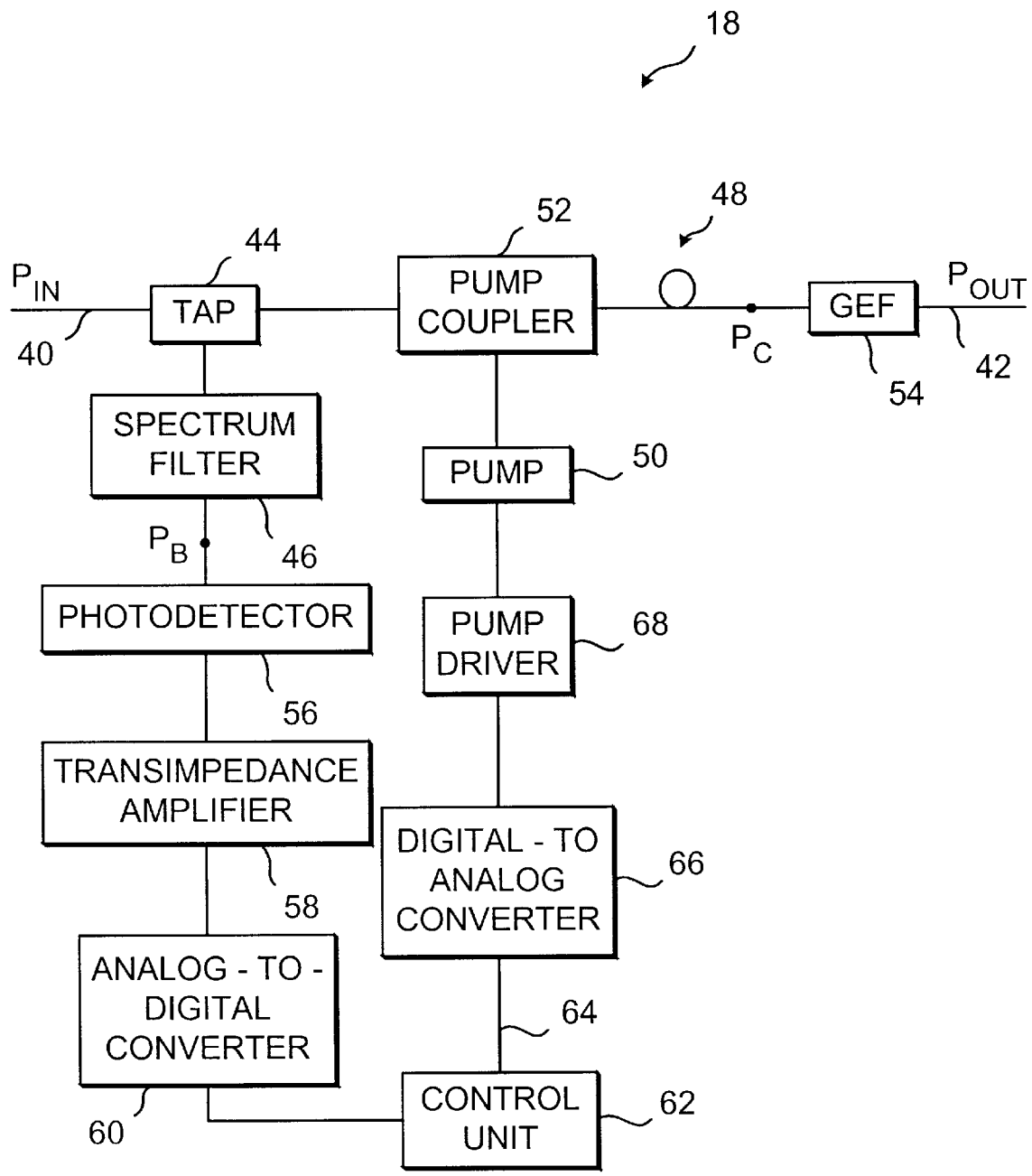
FIG. 10 is a schematic diagram of an illustrative optical amplifier with transient control capabilities in accordance with the present invention.

An illustrative amplifier 18 in accordance with the present invention is shown in FIG. 10. The amplifier 18 of FIG. 10 is somewhat simplified to avoid over-complicating the drawing. For example, amplifier 18 of FIG. 10 has only a single gain stage. This is merely illustrative. Amplifier 18 may have multiple gain stages (e.g., multiple rare-earth-doped or erbium-doped fiber coils). Amplifiers such as amplifier 18 may also have additional components such as variable optical attenuators, dispersion compensation modules, telemetry channel filters, isolators, pumps, taps, etc.

As shown in FIG. 10, input signals may be provided to amplifier 18 at input fiber 40. Amplified output signals are provided at output fiber 42. A tap 44 (e.g., a 2%/98% tap) may be used at the input to amplifier 18 to measure an optical signal that is directly proportional to the input power ($P_{IN}$). The tapped (2%) signal is spectrally-filtered by spectrum filter 46. The transmission spectrum of filter 46 matches (or at least roughly approximates) the unflattened gain spectrum of the gain medium in amplifier 18. In the example of FIG. 10, gain is provided by a fiber coil 48. Fiber coil 48 may be, for example, a rare-earth-doped fiber such as an erbium-doped fiber. In this situation, the transmission spectrum of spectrum filter 46 may be selected to match the gain spectrum of the erbium-doped fiber coil.

Fiber coil 48 may be pumped by pump 50. Light from pump 50 may be coupled into coil 48 by pump coupler 52. Pump 50 may be any suitable source of pump light such as one or more laser diodes operating at, for example, 980 nm or 1480 nm or other suitable wavelengths. Pump coupler 52 may be any suitable pump coupler such as a wavelength-division-multiplexing (WDM) coupler. If desired, a circulator arrangement may be used to couple pump light into coil 48.

Input signals from input 40 pass through tap 44 and pump coupler 52. These input signals are amplified in coil 48. The gain spectrum of coil 48 is not flat, so signals at different wavelengths may be amplified by different amounts. A gain equalization filter (gain flattening filter) 54 may therefore be used to flatten the output spectrum from coil 48, so the amplified signals on different channels are equal in magnitude when they reach output 42.

The spectrally-filtered input power signal at the output of spectrum filter 46 ($P_B$) may be converted into an electrical signal by photodetector 56. Transimpedance amplifier 58 may be used to convert current signals from photodetector 56 into voltage signals for analog-to-digital converter 60. Control unit 62 receives digital signals from analog-to-digital converter 60 for processing.

Control unit 62 may be based on any suitable control electronics such as one or more microprocessors, microcontrollers, digital signal processors, programmable logic devices, application-specific integrated circuits, etc.

Control unit 62 may process the spectrally-filtered input power information received from analog-to-digital converter 60 and may produce a corresponding digital pump control signal at output 64. The pump control signal may be converted into an analog control signal using digital-to-analog converter 66. The analog control signal from digital-to-analog converter 66 may be strengthened into a drive signal for pump 50 using pump driver 68.

The transmission spectrum of the input power spectrum filter matches (exactly or approximately) the gain spectrum of the gain medium in amplifier 18. In the example of FIG. 10, the transmission spectrum of spectrum filter 46 matches (exactly or approximately) the gain spectrum of fiber coil 48.

Figure 11:
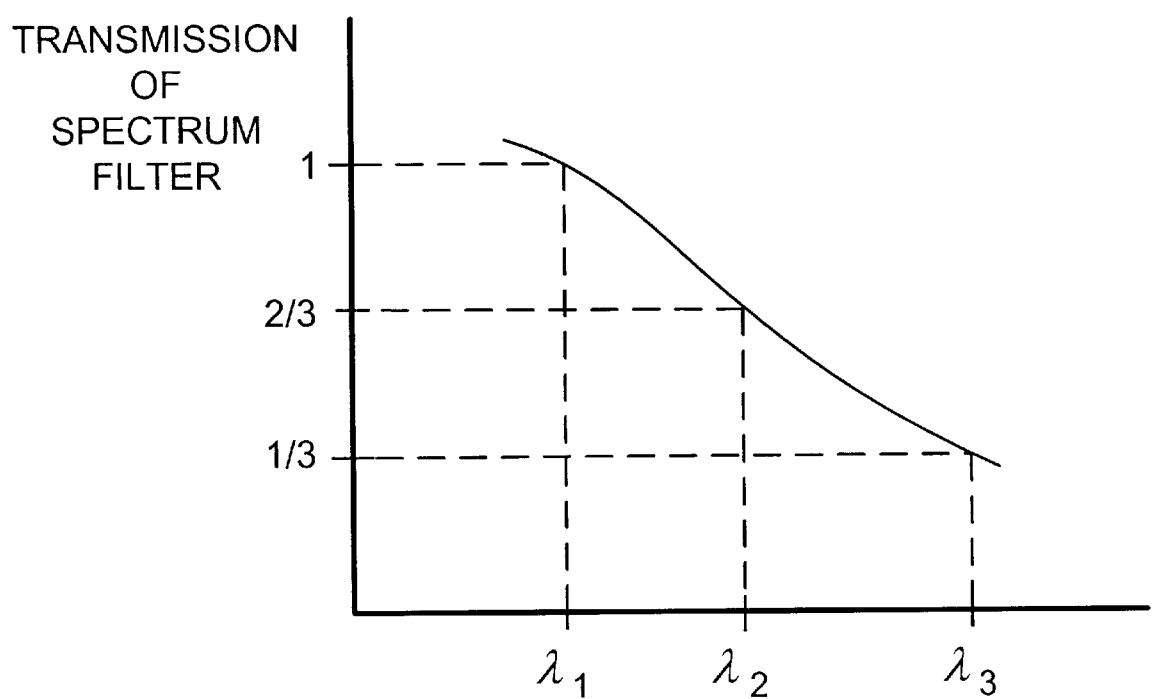
FIG. 11 is a graph showing a portion of the transmission spectrum of an illustrative spectrum filter for filtering input signals in accordance with the present invention.

A portion of the transmission spectrum of an illustrative spectrum filter 46 is shown in FIG. 11. In this example, the transmission spectrum shown in FIG. 11 matches (i.e., is directly proportional to) the gain spectrum of fiber coil 48 that is shown in FIG. 4.

Spectrum filter 46 impresses the spectral characteristics of coil 48 onto the input power signals. This allows the measured filtered input power $P_B$ to be used in controlling the output power $P_C$ from coil 48. In particular, the pump power applied to coil 48 by pump 50 ($P_{PUMP}$) can be made to directly track the input power measured by photodetector 56 ($P_B$), as shown in equation 1

$$P_{PUMP} = a\, P_B \tag{1}$$

The fitting constant "a" may be determined experimentally. The value of $P_B$ depends on both the power of the input signal $P_{IN}$ and the spectrum of the input signal.

The control scheme of equation 1 is a feed-forward approach in which spectral filtering is applied to the input power. This scheme may be implemented using control unit 62 of FIG. 10.

An illustrative example showing how the amplifier of FIG. 10 may respond to input power transients when using the control scheme of equation 1 is shown in FIGS. 12–15. In this set of examples, illustrative channels 1, 2, and 3 are supplied to input 40. Each channel has an input power of 0.01 W. As with the unfiltered feed-forward example of FIGS. 7–9, channel 1 operates at $\lambda_1$, channel 2 operates at $\lambda_2$, and channel 3 operates at $\lambda_3$.

Initially, all three channels are carried by the system. As shown in the table of FIG. 12, the input power for all three channels is the same (0.01 W), but due to the illustrative portion of the gain spectrum of coil 48 shown in FIG. 4, the amplified power $P_C$ per channel at the output of coil 48 is greatest for channel 1 and is lowest for channel 3. The transmission of the gain equalization filter 54 (illustrated by the portion of the transmission spectrum shown in FIG. 5) is selected to equalize for the channel-to-channel differences in the power $P_C$. Accordingly, when all three channels are being carried, the output power at output 42 is the same (⅙ W) for each channel.

Spectrum filter 46 modifies the input power spectrum, so that the measured input powers $P_B$ for each channel are proportional to the output power $P_C$ for each channel at the output of coil 48. This allows control unit 62 to control the pump power produced at pump 50 based on the measured total power $P_B$.

For example, if channels 2 and 3 are dropped, as shown in the table of FIG. 13, the filtered input power $P_B$ to the system is ½ of its original value (i.e., 0.01 W rather than 0.02 W). The measured spectrally-filtered input power $P_B$ for the surviving channel (channel 1) is 0.01 W, because the transmission of spectrum filter 46 is 1 at $\lambda_1$, as shown in FIG. 11. Control unit 62 senses that the power $P_B$ has dropped to ½ of its original value, so control unit 62 reduces the pump power of pump 50 to ½ of its previous value in accordance with equation 1. This reduces the total output power $P_C$ to ½ W. If amplifier 18 is operating in saturation, the total amount of this output power will be used to amplify the surviving channel (channel 1). As shown in the table of FIG. 13, the output power $P_C$ for channel 1 is therefore ½ W. Gain equalization filter 54 (which has the illustrative transmission spectrum of FIG. 5) reduces the output power from ½ W to ⅙ W at output 42. The output power on channel 1 after channels 2 and 3 have been dropped (⅙ W) is therefore the same as it was before channels 2 and 3 were dropped.

Another input power transient scenario is illustrated in FIG. 14. Initially, all three channels are being amplified by amplifier 18 (as shown in FIG. 12). If channels 1 and 3 are dropped, as shown in the table of FIG. 14, the filtered input power $P_B$ to the system drops to ⅓ of its original value (i.e., 0.0067 W rather than 0.02 W). The measured spectrally-filtered input power $P_B$ for the surviving channel (channel 2) is 0.0067 W, because the transmission of spectrum filter 46 is ⅔ at $\lambda_2$, as shown in FIG. 11. Control unit 62 senses that the power $P_B$ has dropped to ⅓ of its original value, so control unit 62 reduces the pump power of pump 50 to ⅓ of its previous value in accordance with equation 1. This reduces the total output power $P_C$ to ⅓ W. If amplifier 18 is operating in saturation, the total amount of this output power will be used to amplify the surviving channel (channel 2). As shown in the table of FIG. 14, the output power $P_C$ for channel 2 is therefore ⅓ W. Gain equalization filter 54 (which has the illustrative transmission spectrum of FIG. 5) reduces the output power from 1/3 W to ⅙ W at output 42. The output power on channel 2 after channels 1 and 3 have been dropped (⅙ W) is therefore the same as it was before channels 1 and 3 were dropped.

The response of amplifier 18 to an input transient scenario in which channels 1 and 2 are dropped is shown in the table of FIG. 15. Initially, all three channels are being amplified by amplifier 18 (as shown in FIG. 12). If channels 1 and 2 are dropped, as shown in the table of FIG. 15, the filtered input power $P_B$ to the system drops to ⅙ of its original value (i.e., 0.0033 W rather than 0.02 W). The measured spectrally-filtered input power $P_B$ for the surviving channel (channel 3) is 0.0033 W, because the transmission of spectrum filter 46 is ⅓ at $\lambda_3$, as shown in FIG. 11. Control unit 62 senses that the power $P_B$ has dropped to ⅙ of its original value, so control unit 62 reduces the pump power of pump 50 to ⅙ of its previous value in accordance with equation 1. This reduces the total output power $P_C$ to ⅙ W. If amplifier 18 is operating in saturation, the total amount of this output power will be used to amplify the surviving channel (channel 3). As shown in the table of FIG. 15, the output power $P_C$ for channel 3 is therefore ⅙ W. Gain equalization filter 54 (which has the illustrative transmission spectrum of FIG. 5) passes the full output power $P_C$ (⅙ W) on channel 3 to output 42, so the power at output 42 is ⅙ W. The final output power of amplifier 18 on channel 3 after channels 1 and 2 have been dropped (⅙ W) is therefore the same as it was before channels 1 and 2 were dropped.

Figure 16:
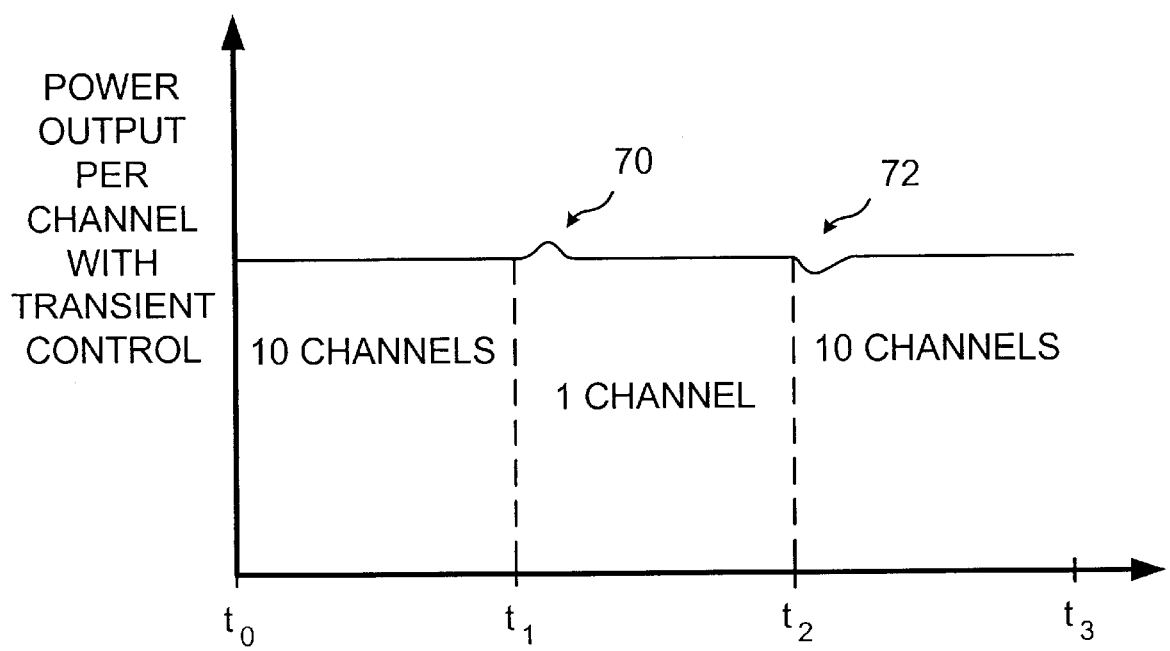
FIG. 16 is a graph showing an illustrative output from an amplifier such as the amplifier of FIG. 10 under transient input power conditions in accordance with the present invention.

A graph showing the consistency of the output power per channel for an amplifier of the type shown in FIG. 10 is shown in FIG. 16. Initially, between time to and $t_1$, the amplifier is handling ten channels. At time $t_1$, nine of the channels are dropped. A small transient 70 in the output power may be produced, but the transient control scheme used by amplifier 18 significantly limits the magnitude of the transient. A similarly small transient 72 may be produced when transitioning from one channel to ten channels at time $t_2$.

By using a spectrum filter to modify the measured input signals to the amplifier, feed-forward control techniques may be used to reduce output power transients in the amplifier due to fluctuations in input power. The spectral shape of the spectrum filter should be approximately or exactly matched to the spectral shape of the amplifier's gain medium. In erbium-doped fiber amplifiers, for example, the spectral shape of the spectrum filter should be matched to the gain spectrum of the erbium-doped fiber coils. The overall gain spectrum of the amplifier typically differs from the gain spectrum of the gain medium. For example, the overall gain spectrum of the amplifier may be flat, whereas the gain spectrum of a gain media may vary considerably. In general, if the spectrum filter shape matches the spectrum of the gain medium, transients may be well controlled regardless of whether the input signal powers are uniform from channel to channel or whether the overall gain of the amplifier is flat. Transients may be controlled even if the input signal powers vary from channel to channel and the overall gain of the amplifier is tilted or is otherwise not flat.

Figure 17:
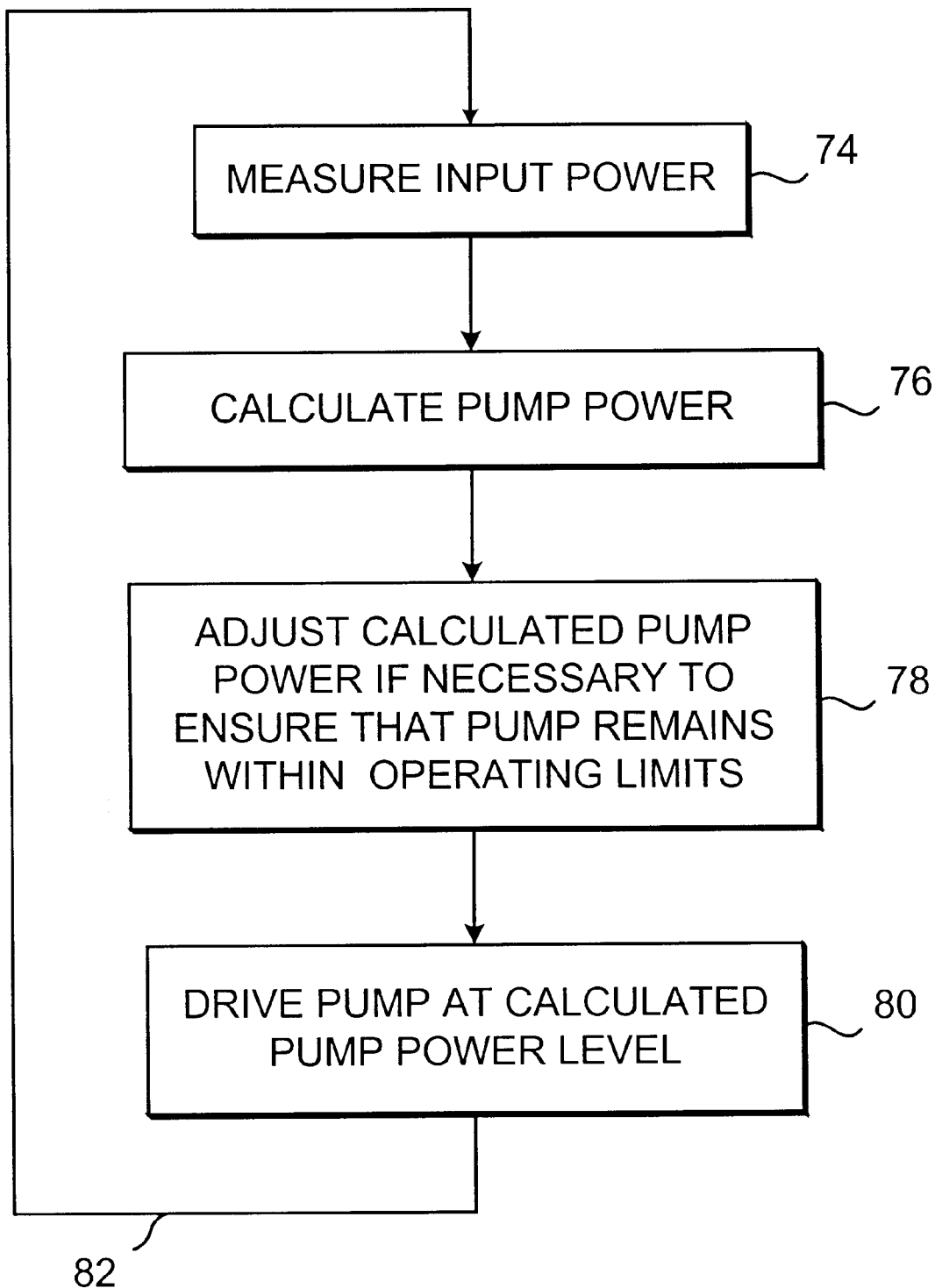
FIG. 17 is a flow chart of illustrative steps involved in providing transient control with the amplifier of FIG. 10 in accordance with the present invention.

Illustrative steps involved in controlling amplifier transients in an optical amplifier such as the optical amplifier of FIG. 10 using the transient control technique described in connection with FIGS. 12–15 are shown in FIG. 17. The steps of FIG. 17 may be performed in a continuous loop. For example, steps 74, 76, 78, and 80 may all be performed once every 100 ns.

At step 74, the amplifier may measure the input power using tap 44. Spectrum filter 46 modifies the input power spectrum. The spectrally-filtered input power may be measured by photodetector 56.

Control unit 62 may calculate the appropriate pump power at step 76 using equation 1, as described in connection with FIGS. 12–15. This is a feed-forward scheme in which the signal that is used to control the pump settings is based on the spectrally-filtered input power ($P_B$)

At step 78, control unit 62 may adjust the calculated pump power if necessary to ensure that the pump is operated within normal operating limits. For example, if the calculated pump power value is below the minimum required to ensure that the lasing threshold of pump 50 is surpassed, the calculated pump power may be raised to the lasing threshold value. If the calculated pump power value is above the maximum safe operating limit of pump 50, the calculated pump power may be lowered to ensure that the pump is not damaged.

At step 80, pump 50 may be driven at the calculated pump power level by supplying an appropriate drive signal to pump 50 using control unit 62, digital-to-analog converter 66, and pump driver 68.

As shown by line 82, after step 80 is completed, steps 74, 76, 78, and 80 are repeated. The loop speed is determined by the capabilities of the control electronics. In general, the control electronics should be selected to operate as rapidly as possible within cost constraints.

If desired, feedback from the output of amplifier 18 may be used to control transients. Feedback information may be used in combination with information on the spectrally-filtered input signals measured at photodetector 56. An illustrative amplifier arrangement with which feedback may be used to control transients is shown in FIG. 18.

Figure 18:
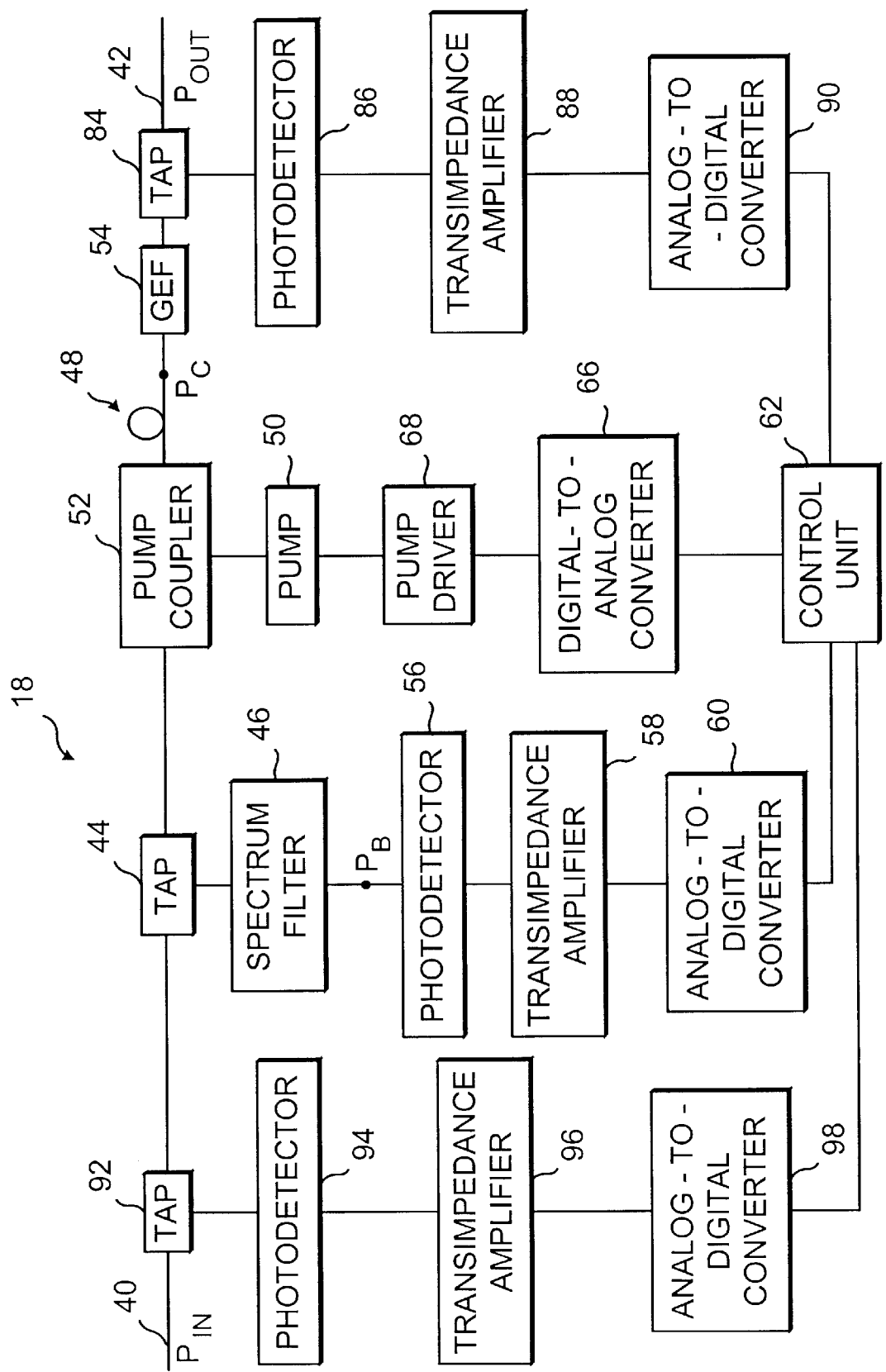
FIG. 18 is a schematic diagram of an illustrative optical amplifier with transient control capabilities based on input power and output power measurements in accordance with the present invention.

Amplifier 18 of FIG. 18 may have a tap 84 (e.g., a 2%/98% tap) for measuring the output power $P_{OUT}$ at output 42. A photodetector 86 may be used to convert optical signals from tap 84 into current signals that are processed by transimpedance amplifier 88. Analog-to-digital converter 90 may be used to convert analog voltage signals from amplifier 88 into digital signals for processing by control unit 62.

Amplifier 18 of FIG. 18 may also have an unfiltered input power tap 92 (e.g., a 2%/98% tap) for measuring the unfiltered input power PIN. A photodetector 94 may be used to convert optical signals from tap 92 into current signals that are processed by transimpedance amplifier 96. Analog-to-digital converter 98 may be used to convert analog voltage signals from amplifier 96 into digital signals for processing by control unit 62.

Control unit 62 may use the arrangement of FIG. 18 to calculate feed-forward and feedback contributions to the pump power to be produced by pump 50. With this type of hybrid control scheme, feed-forward control information may be based on the spectrally-filtered input power that is measured at photodetector 56 and feedback control information may be based on the unfiltered input and output powers measured using photodetectors 92 and 86.

For example, a feed-forward pump contribution $P_{PUMP-FF}$ may be calculated by multiplying the spectrally-filtered input power $P_B$ times a fitting constant A, as shown in equation 2a or using fitting constants A and B, as shown in equation 2b.

$$P_{PUMP-FF} = A \, P_B \tag{2a}$$

$$P_{PUMP-FF} = A \, P_B + B \tag{2b}$$

Both equations 2a and 2b are linear approximations. Any suitable functional form may be used to represent the proportionality between the feed-forward pump contribution and the measured input power if desired. For example, higher-order functional forms may be used to define the relationship between input power and feed-forward pump power. The fitting constants A and B may be determined experimentally. A feedback pump contribution $P_{PUMP-FB}$ may be calculated by calculating a gain error parameter E using the expressions of equations 3 and 4.

$$G_{measured} = P_{OUT}/P_{IN} \tag{3}$$

$$E = G_{measured} - G_{desired} \tag{4}$$

In equation 3, $P_{OUT}$ is the output power measured at step 76 and $P_{IN}$ is the unfiltered input power measured with photodetector 94. The parameter $G_{measured}$ is the measured gain. In equation 4, $G_{desired}$ is the desired (constant) gain for amplifier 18 and E is the gain error parameter. The gain error parameter E may be used to calculate the feedback pump contribution $P_{PUMP-FB}$, as shown in equation 5

$$P_{PUMP-FB} = (\alpha E + \beta \int E + \gamma E') \tag{5}$$

In equation 5, $\alpha$, $\beta$, and $\gamma$ are fitting parameters that may be determined experimentally. Equation 5 is based on the well-known proportional-integral-derivative (PID) method. Any other suitable feedback technique may be used to calculate the feedback pump contribution if desired.

The calculated feedback pump contribution $P_{PUMP-FB}$ and the calculated feed-forward pump contribution $P_{PUMP-FF}$ may be used to generate a desired value ($P_{PUMP}$) at which to drive the pump. Any suitable combining function f may be used, as set forth in equation 6.

$$P_{PUMP} = f(P_{PUMP-FF}, P_{PUMP-FB}) \tag{6}$$

As an example, $P_{PUMP}$ may be calculated by linearly combining $P_{PUMP-FF}$ and $P_{PUMP-FB}$ as set forth in equation 7.

$$P_{PUMP} = P_{PUMP-FF} + P_{PUMP-FB} \tag{7}$$

The calculated pump power may be adjusted (if necessary) to ensure that the pump 50 operates within normal operating limits. For example, if the calculated pump power value is below the minimum required to ensure that the lasing threshold of pump 50 is surpassed, the calculated pump power may be raised to the lasing threshold value. If the calculated pump power value is above the maximum safe operating limit of pump 50, the calculated pump power may be lowered to ensure that the pump is not damaged.

The pump may be driven at the calculated pump power level by supplying an appropriate drive signal to pump 50 using control unit 62, digital-to-analog converter 66, and pump driver 68.

This procedure may be performed in a continuous loop (e.g., once every 100 ns or other appropriate time period), as described in connection with FIG. 17.

Using feedback in addition to feed-forward pump control based on the spectrally-filtered input power may allow transients to be controlled more accurately than would otherwise be possible. For example, using feedback may allow amplifier 18 to correct for gain drift due to fiber and component aging and other long-term effects.

It will be understood that the foregoing is merely illustrative of the principles of this invention, and that various modifications can be made by those skilled in the art without departing from the scope and spirit of the invention.

What is claimed is:

1. An optical amplifier that amplifies optical signals at different wavelengths in a fiber-optic communications link comprising:

an input fiber that receives optical signals to be amplified;

an output fiber with which amplified optical signals are supplied;

at least one rare-earth-doped fiber;

at least one pump that optically pumps the rare-earth-doped fiber to provide optical gain for the optical signals, wherein the optically-pumped rare-earth-doped fiber has a gain spectrum;

an input tap to tap the optical signals at the input fiber;

a spectrum filter coupled to the input tap that modifies the spectrum of the tapped optical signals at the input to provide modified tapped optical signals, wherein the spectrum of the spectrum filter matches the gain spectrum of the rare-earth-doped fiber;

a control unit; and a photodetector coupled to the spectrum filter that converts the modified tapped optical signals into electrical signals for processing by the control unit, wherein the control unit controls the power of the pump to prevent gain transients using a feed-forward control scheme based on the modified tapped optical signals.

2. The optical amplifier defined in claim 1 wherein the control unit is configured to adjust the pump when necessary to ensure that the pump remains within operating limits.

3. The optical amplifier defined in claim 1 wherein the rare-earth-doped fiber comprises erbium-doped fiber.

4. The optical amplifier defined in claim 1 wherein the rare-earth-doped fiber comprises erbium-doped fiber and wherein the pump comprises at least one laser diode operating at 980 nm.

5. The optical amplifier defined in claim 1 further comprising an output tap to tap the amplified optical signals at the output fiber.

6. The optical amplifier defined in claim 1 further comprising:

an output tap to tap the amplified optical signals at the output fiber; and a photodetector coupled to the output tap that converts the tapped amplified optical signals from the output fiber into electrical signals for processing by the control unit, wherein the control unit controls the power of the pump to prevent gain transients using a combination of feed-forward and feedback control schemes based at least partly on the modified tapped optical signals and the tapped amplifier optical signals.

7. The optical amplifier defined in claim 6, wherein the optical signals at the input fiber have a total input power and the amplified optical signals at the output fiber have a total output power and wherein the control unit is configured to calculate the gain of the amplifier by dividing the total output power by the total input power.

8. The optical amplifier defined in claim 1 further comprising an additional input tap to monitor the optical signals at the input fiber without a spectrum filter.

9. The optical amplifier defined in 1 further comprising:

an input tap without a spectrum filter to monitor unfiltered optical signals at the input fiber;

a photodetector coupled to the input tap without the spectrum filter that converts the unfiltered optical signals from the input tap without the spectrum filter into electrical signals for processing by the control unit;

an output tap to tap the amplified optical signals at the output fiber; and a photodetector coupled to the output tap that converts the tapped amplified optical signals from the output fiber into electrical signals for processing by the control unit, wherein the control unit calculates amplifier gain using the tapped amplified optical signals from the output tap and using the unfiltered optical signals from the input tap without the spectrum filter and wherein the control unit controls the power of the pump to prevent gain transients using a combination of feed-forward and feedback control schemes based on the modified tapped optical signals and the calculated gain.

10. The optical amplifier defined in claim 1 wherein the control unit monitors the amplified optical signals at the output fiber and is configured to calculate a feedback contribution to the pump power using the proportional-integral-derivative (PID) method.

11. The optical amplifier defined in claim 1 wherein the control unit is configured to use a linear approximation to calculate a feed-forward contribution to the pump power based on the modified tapped optical signals from the spectrum filter.

12. The optical amplifier defined in claim 1 further comprising a gain equalization filter that flattens the gain spectrum of the rare-earth-doped fiber.

13. A fiber-optic communications link that handles optical signals at different wavelengths comprising:

a transmitter and a receiver;

a plurality of fiber spans for transmitting optical signals between the transmitter and receiver; and a plurality of optical amplifiers, each of which is located between two of the fiber spans and each of which has:

an input fiber that receives the optical signals from a first of the two fiber spans;

an output fiber that provides amplified optical signals to a second of the two fiber spans;

at least one rare-earth-doped fiber;

at least one pump that optically pumps the rare-earth-doped fiber to provide optical gain for the optical signals, wherein the optically-pumped rare-earth-doped fiber has a gain spectrum;

an input tap to tap the optical signals at the input fiber;

a spectrum filter coupled to the input tap that modifies the spectrum of the tapped optical signals at the input to provide modified tapped optical signals, wherein the spectrum of the spectrum filter matches the gain spectrum of the rare-earth-doped fiber;

a control unit; and a photodetector coupled to the spectrum filter that converts the modified tapped optical signals into electrical signals for processing by the control unit, wherein the control unit controls the power of the pump to prevent gain transients using a feed-forward control scheme based on the modified tapped optical signals.

14. The fiber-optic communications link defined in claim 13 wherein the control unit in each amplifier is configured to adjust the pump when necessary to ensure that the pump remains within operating limits.

15. The fiber-optic communications link defined in claim 13 wherein the rare-earth-doped fiber in each amplifier comprises erbium-doped fiber.

16. The fiber-optic communications link defined in claim 13 wherein the rare-earth-doped fiber in each amplifier comprises erbium-doped fiber and wherein the pump in each amplifier comprises at least one laser diode operating at 980 nm.

17. The fiber-optic communications link defined in claim 13 further comprising an output tap in each amplifier to tap the amplified optical signals at the output fiber in that amplifier.

18. The fiber-optic communications link defined in claim 13 wherein each amplifier further comprises:

an output tap to tap the amplified optical signals at the output fiber; and a photodetector coupled to the output tap that converts the tapped amplified optical signals from the output fiber into electrical signals for processing by the control unit, wherein the control unit controls the power of the pump to prevent gain transients using a combination of feed-forward and feedback control schemes based on the modified tapped optical signals and the tapped amplified optical signals.

19. The fiber-optic communications link defined in claim 18 wherein in each amplifier the optical signals at the input fiber have a total input power and the amplified optical signals at the output fiber have a total output power and wherein the control unit in each amplifier is configured to calculate the gain of that amplifier by dividing the total output power by the total input power.

20. The fiber-optic communications link defined in claim 13 wherein each amplifier further comprises an additional input tap to monitor the optical signals at the input fiber without a spectrum filter.

21. The fiber-optic communications link defined in 13 wherein each amplifier further comprises:
an input tap without a spectrum filter to monitor unfiltered optical signals at the input fiber;
a photodetector coupled to the input tap without the spectrum filter that converts the unfiltered optical signals from the input tap without the spectrum filter into electrical signals for processing by the control unit;
an output tap to tap the amplified optical signals at the output fiber; and
a photodetector coupled to the output tap that converts the tapped amplified optical signals from the output fiber into electrical signals for processing by the control unit, wherein the control unit calculates amplifier gain using the tapped amplified optical signals from the output tap and using the unfiltered optical signals from the input tap without the spectrum filter and wherein the control unit controls the power of the pump to prevent gain transients using a combination of feed-forward and feedback control schemes based on the modified tapped input optical signals and the calculated gain.

22. The fiber-optic communications link defined in claim 13 wherein the control unit in each amplifier monitors the amplified optical signals at the output fiber and is configured to calculate a feedback contribution to the pump power using the proportional-integral-derivative (PID) method.

23. The fiber-optic communications link defined in claim 13 wherein the control unit in each amplifier is configured to use a linear approximation to calculate a feed-forward contribution to the pump power based on the modified tapped optical signals from the spectrum filter.

24. The fiber-optic communications link defined in claim 13 further comprising a gain equalization filter in each amplifier that flattens the gain spectrum of the rare-earth-doped fiber in that amplifier.

25. A method for controlling gain transients in a rare-earth-doped fiber amplifier, wherein the rare-earth-doped fiber amplifier has rare-earth-doped fiber, wherein the rare-earth-doped fiber is pumped using a pump laser to produce a gain spectrum, so that optical input signals that are provided to an input are amplified and provided as corresponding amplified optical output signals at an output, comprising:
spectrally-filtering the optical input signals with a spectrum filter having a transmission spectrum that matches the gain spectrum of the rare-earth-doped fiber; and
adjusting the pump power produced by the pump laser in response to changes in the spectrally-filtered optical input signals to prevent gain transients due to changes in the optical input signals.

26. The method defined in claim 25 wherein the pump laser has a lasing threshold, the method further comprising adjusting the pump power when necessary to ensure that the pump laser exceeds the lasing threshold.

27. The method defined in claim 25 wherein the pump laser has a maximum safe operating limit, the method further comprising adjusting the pump power when necessary to ensure that the pump laser does not exceed the maximum safe operating limit.

28. The method defined in claim 25 further comprising adjusting the pump power produced by the pump laser based on a calculated feed-forward pump power contribution to the pump power that is proportional to the measured power of the spectrally-filtered optical input signals.

29. The method defined in claim 25 further comprising adjusting the pump power produced by the pump laser based on a calculated feed-forward contribution to the pump power that is linearly proportional to the measured power of the spectrally-filtered optical input signals.

30. The method defined in claim 25 further comprising adjusting the pump power produced by the pump laser based on a calculated feedback pump power contribution that is determined by measuring the gain of the amplifier.

31. The method defined in claim 25 further comprising adjusting the pump power produced by the pump laser based on a calculated feedback pump power contribution that is determined by measuring the gain of the amplifier using unfiltered optical input signals.

32. The method defined in claim 25 further comprising:
measuring the powers of the optical input signals and optical output signals;
calculating the gain of the amplifier using the measured optical input and output signal powers; and
using the proportional-integral-derivative method to calculate a feedback pump power contribution to the pump power based on the calculated gain.

33. The method defined in claim 25 further comprising using the proportional-integral-derivative method to calculate a feedback pump power contribution to the pump power based on the gain of the amplifier.

34. The method defined in claim 25 further comprising:
monitoring the gain of the amplifier;
calculating a gain error parameter based on the monitored gain; and
adjusting the pump power based on the gain error parameter.

35. The method defined in claim 25 further comprising adjusting the pump power using feedback.

36. The method defined in claim 25 wherein adjusting the pump power comprises adjusting the pump power using a hybrid control technique involving feed-forward and feedback control techniques.

37. The method defined in claim 25 further comprising:
calculating a feed-forward pump power contribution that is proportional to the spectrally-filtered optical input signals;
calculating the gain of the amplifier using measured optical input and output signal powers;
using the proportional-integral-derivative technique to calculate a feedback pump power contribution based on the calculated gain; and
adjusting the pump power based on the feed-forward pump power contribution and the feedback pump power contribution.

38. The method defined in claim 25 wherein the rare-earth-doped fiber amplifier comprises an erbium-doped fiber amplifier.

* * * * *